(12) United States Patent
Iwayama

(10) Patent No.: US 7,007,233 B1
(45) Date of Patent: Feb. 28, 2006

(54) DEVICE AND METHOD FOR ENTERING A CHARACTER STRING

(75) Inventor: Naomi Iwayama, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/457,267

(22) Filed: Dec. 9, 1999

(30) Foreign Application Priority Data

Mar. 3, 1999 (JP) .................................. 11-055031
Sep. 21, 1999 (JP) .................................. 11-266929

(51) Int. Cl.
G06F 17/00 (2006.01)
(52) U.S. Cl. ..................................... 715/531; 715/507
(58) Field of Classification Search ................ 715/507, 715/531, 532, 535; 345/169, 171, 780; 341/23, 341/28; 710/67; 704/10
See application file for complete search history.

(56) References Cited

U.S. PATENT DOCUMENTS

| | | | | |
|---|---|---|---|---|
| 5,128,672 A | * | 7/1992 | Kaehler ...................... | 341/123 |
| 5,387,042 A | * | 2/1995 | Brown ........................ | 400/477 |
| 5,404,299 A | * | 4/1995 | Tsurubayashi et al. ......... | 704/10 |
| 5,818,437 A | * | 10/1998 | Grover et al. .............. | 345/811 |
| 5,829,023 A | * | 10/1998 | Bishop ....................... | 711/118 |
| 5,896,321 A | * | 4/1999 | Miller et al. ........... | 365/189.01 |
| 6,005,498 A | * | 12/1999 | Yang et al. ................... | 341/23 |
| 6,112,215 A | * | 8/2000 | Kaply ........................ | 715/507 |
| 6,170,000 B1 | * | 1/2001 | Bories et al. ............... | 715/535 |
| 6,204,848 B1 | * | 3/2001 | Nowlan et al. .............. | 345/810 |
| 6,307,541 B1 | * | 10/2001 | Ho et al. .................... | 345/171 |
| 6,453,404 B1 | * | 9/2002 | Bereznyi et al. ............ | 711/171 |
| 8,507,891 | * | 1/2003 | Challenger et al. ......... | 711/122 |
| 2002/0188942 A1 | * | 12/2002 | Bryan et al. ................ | 717/176 |

FOREIGN PATENT DOCUMENTS

| | | |
|---|---|---|
| JP | 61-32186 | 2/1986 |
| JP | 4-32966 | 2/1992 |
| JP | 5067079 | 3/1993 |
| JP | 7-129572 | 5/1995 |
| JP | 9-6771 | 1/1997 |
| JP | 9-269943 | 1/1997 |
| JP | 9-179859 | 7/1997 |
| JP | 11-3331 | 1/1999 |

* cited by examiner

Primary Examiner—Sanjiv Shah
(74) Attorney, Agent, or Firm—Staas & Halsey LLP

(57) ABSTRACT

The invention presents a device and a method for entering a character string in which a dictionary is changed dynamically in accordance with the input situation of the user, and in which character strings that are generally suitable for the input situation of the user can be entered. When a character string is entered, the situation in which the character string is entered is acquired. In accordance with the acquired situation, a dictionary used for the generation of candidate character strings or a portion of such a dictionary are affirmed as a situation-optimized dictionary. Optimized output candidate character strings are generated and outputted in accordance with the situation from character strings that have been input using this situation-optimized dictionary, and when output candidate character strings are affirmed and outputted, the affirmed character strings are stored in the situation-optimized dictionary in accordance with the acquired situation.

9 Claims, 24 Drawing Sheets

| input | candidate character string |
|---|---|
| • | • |
| 212 | 会議 [ka-i-gi] |
| • • • | • • • |

(a)

(b)

| input | candidate character string |
|---|---|
| • | • |
| 212 | 小池 [ko-i-ke] |
| • • • | • • • |

(a)

(b)

| numeric string | stored character string | last access date | access recurrence |
|---|---|---|---|
| • | • | | |
| 212 | 会議<br>[ka-i-gi] | 99/9/3 | 1 |
| • | • | | |
| 212 | 恵子<br>[ke-i-ko] | 99/9/6 | 10 |
| •<br>• | •<br>• | | |

| 礼<br>[rei] | 797 |
|---|---|
| 社<br>[sha] | 748 |
| 杠 | 669 |
| 杜 | 663 |
| 私 | 659 |

(b)

| 長<br>[cho] | 759 |
|---|---|
| δ | 710 |
| 菟 | 650 |
| 雇 | 648 |
| を<br>[wo] | 643 |

FIG. 9

| stored character string | last access date | access recurrence |
|---|---|---|
| • | | |
| 礼を<br>[rei-wo] | 99/1/3 | 1 |
| • | | |
| 社長<br>[sha-cho] | 99/1/6 | 10 |
| •<br>• | | |

FIG. 11

| candidate character string | estimate value |
|---|---|
| 礼長<br>[rei-cho] | 1556 |
| 社長<br>[sha-cho] | 1567 |
| • | |
| 礼を<br>[rei-wo] | 1500 |
| •<br>• | |

FIG. 12

| registered character string | last access date | access recurrence |
|---|---|---|
| • | | |
| hat | 99/1/3 | 1 |
| • | | |
| hut | 99/1/3 | 1 |
| •<br>• | | |

| h | 858 |
|---|-----|
| b | 809 |
| l | 792 |

| a | 839 |
|---|-----|
| u | 783 |
| o | 707 |

| t | 888 |
|---|-----|
| n | 681 |
| x | 675 |

FIG. 15

| candidate character string | estimate value |
|---|---|
| hat | 2810 |
| hut | 2754 |
| • | |
| bat | 2536 |
| •<br>• | |

FIG. 16

| registered character string | last access date | access recurrence |
|---|---|---|
| • | | |
| hat | 99/1/3 | 1 |
| • | | |
| hut | 99/1/6 | 2 |
| •<br>• | | |

FIG. 17

| candidate character string | estimate value |
|---|---|
| hat | 2810 |
| hut | 2859 |
| • | |
| bat | 2536 |
| •<br>• | |

礼[rei] 長[cho]　　社[sha] 長[cho]

礼[rei]　　礼[rei]
社[sha]　　社[sha]
杠　　　　杠
杜　　　　杜
私　　　　私

DEVICE AND METHOD FOR ENTERING A CHARACTER STRING

BACKGROUND OF THE INVENTION

1. Field of the Invention

The present invention relates to a device and a method for entering a character string. In particular, the present invention relates to a device and a method for entering a character string, in which there are a plurality of character strings that are output candidates with respect to the input.

2. Description of the Prior Art

The usual method for entering a character string into a computer system is to input characters with a keyboard. However, in the case of languages with an abundance of characters such as Japanese, it is physically impossible to implement a number of keys corresponding to all different characters. Instead, a "kana" character string or a Latin character string (written in "romaji") is typed into the keyboard, and the character string is entered by kana-kanji conversion.

In order to reduce the number of characters that have to be typed, methods have been proposed, in which characters can be entered using an input prediction function, allowing them to be entered without typing in the entire character string. In addition, methods have been proposed for entering characters without using a keyboard. With such methods, characters can be input by using techniques for character recognition of handwritten characters or voice recognition, for example. Moreover, methods have been proposed for entering characters using only the numeric keys of portable terminals, like portable telephones.

With these methods for entering characters, it is not possible to determine a character string unequivocally from the input, so that, by reference to a suitable dictionary, the appropriate character string is determined from a plurality of character strings that are output candidates.

For example, Publication of Unexamined Japanese Patent Application (Tokkai) No. Sho 61-32186 discloses a method using dictionaries for individual pattern recognition and dictionaries for context processing that are customized for each user. By using a specialized dictionary for each user, the precision of the character string recognition can be enhanced.

Tokkai Hei 9-179859 discloses a method wherein several conversion modes are prepared beforehand, and the candidate character string is determined by selecting a conversion mode that is suitable with respect to the situation when the character string processing device is used.

Moreover, Tokkai Hei 11-3331 discloses a method wherein the field of the text is specified on the basis of the character strings that are being entered in the text, and candidate character strings are determined using a dictionary corresponding to this field.

Thus, the candidate character string corresponding to an input is determined by reference to a dictionary, and can vary slightly depending on the content of the dictionary. For example, if only the input of a specified field is allowed, it is possible to produce a dictionary whose content matches the input of the user.

However, if the input is unspecified, and the content of the dictionary does not match the user's input, there is the problem that the selection efficiency for candidate character strings does not increase, and the hit ratio for input character strings does not increase. For example, even when a dictionary has been prepared beforehand, it cannot accommodate abbreviations that the user has newly created, new product names or other proper nouns, etc.

Also, dictionaries that can be filled so as to sufficiently accommodate unspecified input are conceivable, but that will increase the size of the dictionary, and consume valuable computer resources, so that there is the problem that handwritten character recognition of online pen input in small terminals, such as PDAs (personal digital assistants), cannot be accommodated physically.

For example, the method disclosed in Tokkai Sho 61-32186 attempts to raise context sensitivity by providing customized dictionaries serving as context-sensitive dictionaries, for each user, but it has the drawback that it cannot adapt flexibly to changes in a usage situation.

The method disclosed in Tokkai Hei 9-179859 attempts to raise the hit ratio for candidate character strings by selecting a conversion mode for a situation to determine a candidate character string. However, it is only possible to select from conversion modes that have been prepared beforehand, this method cannot adapt to unpredictable situation. Also, the selection of the conversion mode is left to the user, and there is no guarantee that the user will select the appropriate conversion mode.

Moreover, it is conceivable to store many conversion modes in order to adapt to many situations, but this will consume a lot of valuable computer resources, so that this is physically impossible in small terminals.

Moreover, in the method disclosed in Tokkai Hei 11-3331, the field of the currently edited text is specified, and a dictionary for the specified field is selected, but here the fields themselves have to be specified beforehand, and in a situation such as entering a character string to produce a short message with, for example, a portable telephone, it is generally difficult to specify such fields. Also, to specify such fields, field-specific dictionaries with sufficient capacity are necessary, which will consume a lot of valuable computer resources, so that this is physically impossible in small terminals.

SUMMARY OF THE INVENTION

It is an object of the present invention to solve the problems of the prior art, and to provide a device and a method for entering a character string, in which a dictionary is changed dynamically in accordance with the input situation of the user, and in which character strings that are generally suitable for the input situation of the user can be entered.

In order to achieve these objects, a device for entering a character string of the present invention comprises an input part for entering a character string; an input situation acquiring part for acquiring a situation for entering a character string; a situation control part for affirming a dictionary used for generating a candidate character string or a part of such a dictionary in accordance with a situation acquired with the input situation acquiring part and designating it as situation-optimized dictionary; a candidate character string generation part for generating and outputting an output candidate character string that is optimal for the situation in response to a character string that is entered with the input part, using the situation-optimized dictionary designated by the situation control part; a candidate character string affirmation processing part for affirming the outputted candidate character string; and an affirmed character string storing part for storing a character string that has been affirmed with the affirmation processing part in the situation-optimized dictionary designated by the situation control part.

With this configuration, character strings that the user has affirmed as input character strings can be stored in a situation-optimized dictionary in adaptation of the situation when the input takes place, so that a situation-optimized dictionary in accordance with the input situation of the user can be changed dynamically, and the input of optimum character strings for an input situation becomes possible.

Moreover, in the device for entering a character string of the present invention, it is preferable that situations acquired by the input situation acquiring part comprise at least one information selected from the group consisting of information relating to a character string processing device to which the output candidate character string is given; information relating to a text that the character string processing: device, to which the output candidate character string is given, can output; information relating to a position in a text that the character string processing device, to which the output candidate character string is given, can output; and information relating to a processing mode with which a character string that has been given to the character string processing device is processed.

Information relating to a character string processing device to which the output candidate character string is given is useful because depending on the differences between character string processing devices, the character strings to be outputted may be limited to a certain extent, depending on whether a schedule is entered, or an electronic mail is entered, etc. Information relating to a text that the character string processing device, to which the output candidate character string is given, can output is useful because the character strings to be outputted also may be limited to a certain extent, depending on the text that can be output. Also, information relating to a position in a text that the character string processing device, to which the output candidate character string is given, can output is useful because the character strings to be outputted also may be limited to a certain extent depending on the text that can be output, depending on the field to be output. And, information relating to a processing mode with which a character string that has been given to the character string processing device is processed is useful because the character strings to be outputted also may be limited to a certain extent depending on whether the processing mode is, for example, the search mode or the storage mode.

Moreover, in the device for entering a character string of the present invention, it is preferable that the situation control part selects the situation-optimized dictionary from a plurality of dictionaries, in accordance with the situation that has been acquired with the input situation acquiring part. This is useful when there is more than one situation-optimized dictionaries, because then a situation-optimized dictionary can be selected that is optimal for a situation.

Moreover, in the device for entering a character string of the present invention, it is preferable that the situation control part changes a method for generating the situation-optimized dictionary from a plurality of dictionaries, in accordance with the situation that has been acquired with the input situation acquiring part, because this way, an optimal candidate character string generation method can be selected.

Moreover, in the device for entering a character string of the present invention, it is preferable that the affirmed character string storing part stores a storage date of an affirmed character string as a last-access date when storing the affirmed character string; the date when a character string that is already stored is accessed is used to change the last-access date; and after calculating, from the stored last-access date and the current date, a period of time that a character string has not been used, character strings which have not been used for a certain period of time are deleted from the situation-optimized dictionary. With this configuration, character strings that have not been used for a certain period of time can be deleted when they are deemed to be of no reuse value for the user, so that the capacity of the situation-optimized dictionary does not grow excessively.

Moreover, in the device for entering a character string of the present invention, it is preferable that the affirmed character string storing part divides an affirmed character string into units of a necessary lower limit, which can be optimized. Thus, by taking short character strings, the hit ratio can be increased, and the processor time necessary for the affirmation can be reduced.

Moreover, it is preferable that the device for entering a character string of the present invention further comprises a situation-optimized dictionary production part for producing a situation-optimized dictionary by treating character strings that are used in a pre-existing electronic text in the same manner as affirmed character strings. Thus, input strings can be input with a certain degree of reliability even when the character input device is used for the first time.

In a computer-readable recording medium storing a program, to be executed on a computer, the program comprising steps for entering a character string; acquiring a situation for entering a character string; affirming a dictionary used for generating a candidate character string or a part of such a dictionary in accordance with an acquired situation designating it as situation-optimized dictionary; generating and outputting an output candidate character string that is optimal for a situation in response to an entered character string, using the designated situation-optimized dictionary; affirming the outputted candidate character string; and storing an affirmed character string in a situation-optimized dictionary.

With this configuration, character strings that the user has affirmed as input character strings can be stored in a situation-optimized dictionary in adaptation of the situation when the input takes place, by loading and executing the program on a computer. Thus, a situation-optimized dictionary in accordance with the input situation of the user can be changed, and input of optimum character strings for an input situation becomes possible.

BRIEF DESCRIPTION OF THE DRAWINGS

FIG. 5 shows an example of the content in a situation-optimized dictionary in an embodiment of a pattern recognition device in accordance with the present invention.

FIG. 9 shows examples of recognized candidate characters.

FIG. 11 shows an example of the content in the situation-optimized dictionary of an embodiment of a pattern recognition device in accordance with the present invention.

FIG. 12 shows an example of the calculated estimate values for recognized candidate character strings.

FIG. 14 shows an example of the content in the situation-optimized dictionary of an embodiment of a pattern recognition device in accordance with the present invention.

FIG. 15 shows examples of recognized candidate characters.

FIG. 16 shows an example of the calculated estimate values for recognized candidate character strings.

FIG. 17 shows an example of the content in the situation-optimized dictionary of an embodiment of a pattern recognition device in accordance with the present invention.

FIG. 18 shows an example of the calculated estimate values for recognized candidate character strings.

FIG. 19 shows an example of a process for correcting a recognized candidate character string.

FIG. 22 shows an example of a process for correcting a recognized candidate character string.

DESCRIPTION OF THE PREFERRED EMBODIMENTS

First Embodiment

Figure 1:
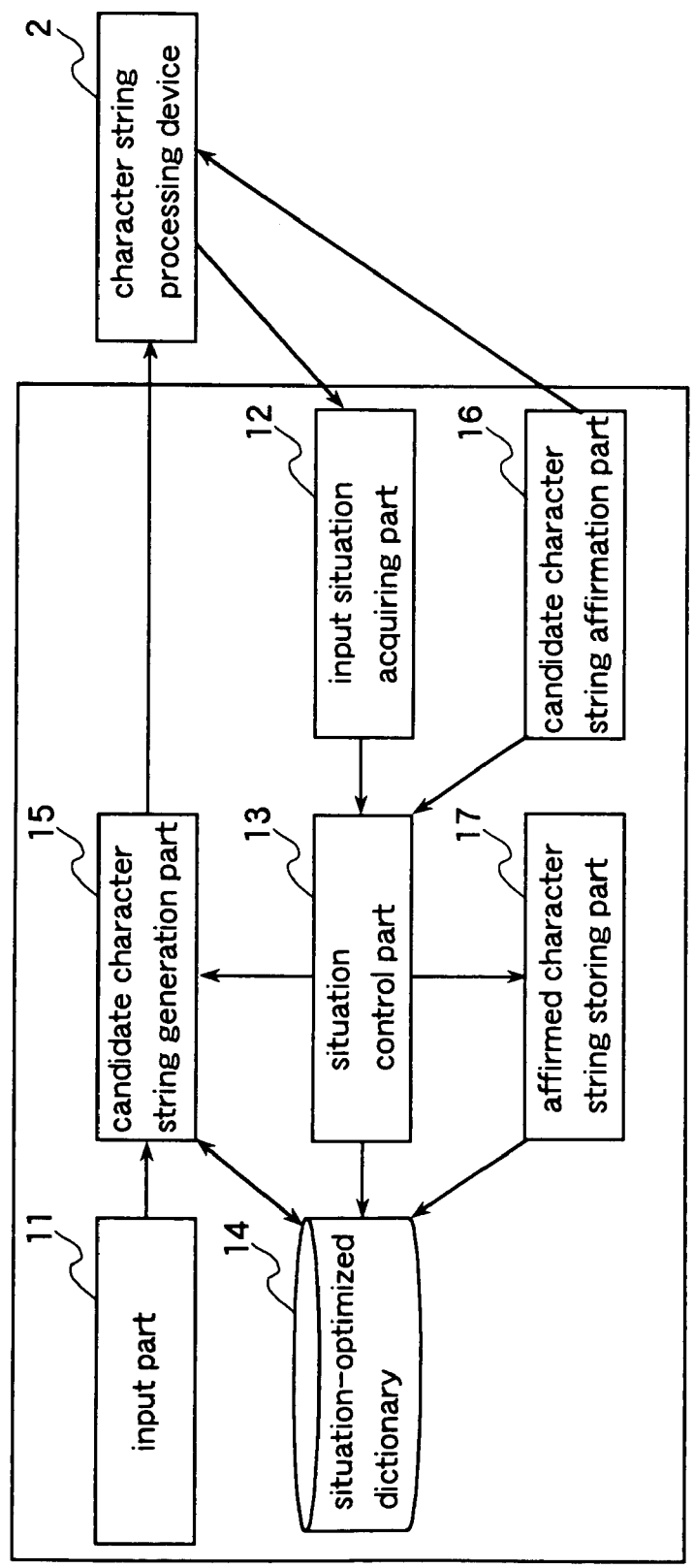
FIG. 1 is a diagram of a first embodiment of a device for entering a character string in accordance with the present invention.

The following is a description of a first embodiment of a device for entering a character string in accordance with the present invention, with reference to the accompanying drawings. FIG. 1 is a block diagram of the first embodiment of a device for entering a character string in accordance with the present invention, which can be applied, for example, to a portable telephone.

In FIG. 1, numeral 11 denotes an input part pertaining to the numeric buttons of a portable telephone, numeral 12 denotes an input situation acquiring part, numeral 13 denotes a situation control part, numeral 14 denotes a situation-optimized dictionary, numeral 15 denotes a candidate character string generation part, numeral 16 denotes a candidate character string affirmation part, numeral 17 denotes an affirmed character string storing part, and numeral 2 denotes a character string processing device for outputting candidate character strings.

In FIG. 1, a character string to be entered into the character string processing device 2 is entered with the input part 11. What is entered in this first embodiment is a signal string, which is generated by pushing down the numeric buttons, i.e. a numeric string. The entered numeric string is sent to the candidate character string generation part 15.

Japanese uses a complex writing system of Chinese characters (also referred to as "Kanji" in the following) and two phonetic syllabic alphabets (also referred to as "Kana" in the following), each of the two phonetic syllabic alphabets comprising ten rows, as shown in Table 1:

TABLE 1

| a-row | ka-row | sa-row | ta-row | na-row | ha-row | ma-row | ya-row | ra-row | wa-row |
|---|---|---|---|---|---|---|---|---|---|
| a | ka | sa | ta | na | ha | ma | ya | ra | wa |
| i | ki | shi | chi | ni | hi | mi | — | ri | — |
| u | ku | su | tsu | nu | fu | mu | yu | ru | n |
| e | ke | se | te | ne | he | me | — | re | — |
| o | ko | so | to | no | ho | mo | yo | ro | wo |

Syllables including other consonants can be rendered with the use of diacritical marks: For example, the kana characters of the "ga"-row are identical to those of the "ka"-row, but are written with the addition of a diacritical mark. Thus, the kana character "gi", for example, is written as "ki"+diacritical mark. The first embodiment requires no distinction for characters with diacritical marks, and the process for entering characters with diacritical marks is the same as the process for entering characters without diacritical marks. Therefore, the process for entering the kana character "gi", for example, is identical to the process for entering the kana character "ki".

In the first embodiment, the characters from the "a"-row to the "ra"-row are assigned to the numbers 1 through 9 of the portable telephone, respectively, and the "wa"-row and "n" are assigned to the number 0 (zero). Thus, any Japanese character string can be entered just by entering the numeric keys.

When the character string processing device 2 has been started and characters are entered, the input situation acquiring part 12 acquires the input situation from the character string processing device 2 into which the character string is given. Here, the "input situation" depends for example on what kind of device the character string processing device 2 is (for example, a schedule inputting device, an electronic mail inputting device, etc.), what kind of text is entered into the character string processing device 2, what the current position in the text is (for example, the "mail address" field in a mail that is being edited), and what mode the character string processing device 2 is in (in a telephone number processing device, for example, search mode, storage mode, etc.).

For example, if a schedule inputting device has been started as the character string processing device 2, the input situation acquiring part 12 is notified by the schedule inputting device that the schedule inputting device has been selected as the character string processing device 2. Moreover, when a change is made to the effect that an input can be made to a simultaneously running electronic mail inputting device, the input situation acquiring part 12 is notified by the electronic mail inputting device that the electronic mail inputting device has been selected as the character string processing device 2.

The character string inputting device itself can also acquire information from the character string processing device 2, for example by acquiring information such as about a program running on the currently active window.

Also, when the character string processing device 2 is in the search mode, the object being searched is also acquired as part of the input situation.

The acquired input situation is sent to the situation control part 13. Based on the acquired information, the situation control part 13 assumes a candidate character string generation state according to the situation. Here, "candidate character string generation state" means that the situation-optimized dictionary 14 is changed in accordance with the situation and the method for generating candidate character strings is changed in accordance with the situation.

As a method for updating the situation-optimized dictionary 14 in accordance with the situation, it is possible to provide different situation-optimized dictionaries 14 for different situations, and to switch between these situation-optimized dictionaries 14. Or, instead of switching between dictionaries, it is also possible to employ a method for updating a priority order, and to provide a field specifying in which situation each item in the situation-optimized dictionary 14 has been used and to use only items of the field corresponding to the situation, or to change the priority order in accordance with a field that corresponds to the situation.

This example relates to the character input in, for example, a portable telephone or a PHS. Conventionally, character input in portable terminals, like portable telephones and PHS devices is performed by using the dial buttons, wherein "1" corresponds to the "a"-row, "2" corresponds to the "ka"-row, etc. The vowel of each syllable is decided by the number of times that the same dial button is pressed. For example, in order to enter the Japanese word "o-ku-ri-ma-su", "1" is pressed 5 times, "2" is pressed 3 times, "9" is pressed 2 times, "7" is pressed 1 time, and "3" is pressed 3 times (see Table 1). Thus, to enter five Japanese kana characters, it is necessary to press the buttons 14 times.

To improve this situation, the simplified input method "T9" has been introduced recently. With "T9", the dial button "1" of the portable telephone or PHS device corresponds to the "a"-row, button "2" corresponds to the "ka"-row, etc., which is the same as above, but an internal language database is provided, and depending on the pressed buttons, variations of the stored words are scanned, and the intended word can be selected instantly. Thus, when entering the Japanese word "o-ku-ri-ma-su", it is sufficient to enter "12975".

But however convenient "T9" may be, it is far from perfect. That is to say, for short words, the number of selected variations grows massively, so that there is the inherent problem that the possibility increases that unintended words are selected.

Figure 2:
FIG. 2 shows an example of the content in a situation-optimized dictionary in the first embodiment of a device for entering a character string in accordance with the present invention.
Figure 3:
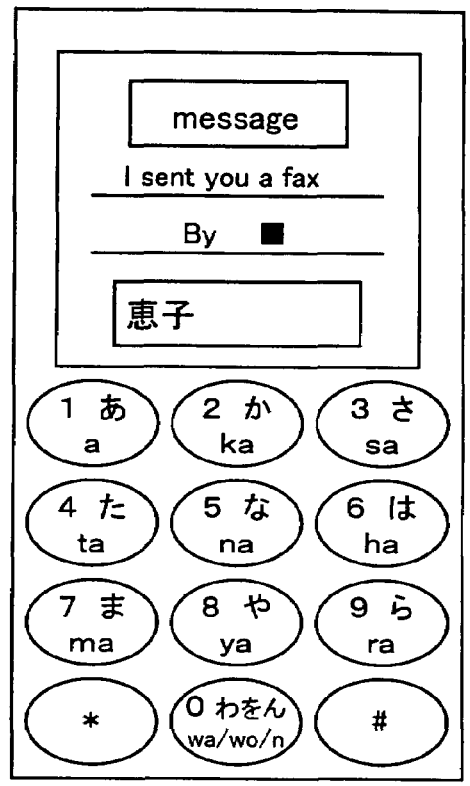
FIG. 3 shows an example of the content in a situation-optimized dictionary in the first embodiment of a device for entering a character string in accordance with the present invention.

Now, the first embodiment limits the words that are selected by "T9" according to the input situation. For example, FIGS. 2(a) and 3(a) show the content of situation-optimized dictionaries 14 for two different situations. FIG. 2 illustrates the situation where the user inputs a schedule (called "situation 1" in the following), whereas FIG. 3 illustrates the situation where the user inputs a short message (called "situation 2" in the following).

In the situation-optimized dictionary 14 for situation 1, character strings are stored that have been entered when using the character string processing device 2 to enter a schedule. Similarly, in the situation-optimized dictionary 14 for situation 2, character strings are stored that have been entered when using the character string processing device 2 to enter a short message.

When the numeric buttons are pressed in the order "212" in situation 1, a candidate character string is generated on the basis of the situation-optimized dictionary 14 for situation 1, so that the candidate character string "ka-i-gi" (which is the Japanese word for "conference") is output into the character string processing device 2 for entering a schedule.

On the other hand, when the numeric buttons are pressed in the same order "212" in situation 2, a candidate character string is generated on the basis of the situation-optimized dictionary 14 for situation 2, so that the candidate character string "ke-i-ko" (which is a Japanese first name) is output into the character string processing device 2 for entering a short message.

If the character string processing device 2 is in the search mode, a possible method for updating the method for generating a candidate character string in accordance with the situation is to take the search object acquired with the situation acquiring part 12 to change the character strings in the situation-optimized dictionary 14 so that they are generated as candidate character strings. Moreover, when the character string processing device 2 is in the input mode, assuming that a character string is entered that is not in the situation-optimized dictionary 14, it is possible to generate even character strings that are not in the situation-optimized dictionary 14 as a candidate character string.

A regular standard dictionary is included during installation, since it is not possible to change the situation-optimized dictionary 14 dynamically, if the situation-optimized dictionary 14 does not fulfill any dictionary functions at the begin of the use of the device for entering a character string of the first embodiment. Consequently, to generate character strings that are not in the situation-optimized dictionary 14, this standard dictionary is used.

Figure 4:
FIG. 4 shows an example of the content in a situation-optimized dictionary in the first embodiment of a device for entering a character string in accordance with the present invention.

FIG. 4 shows an example of the content of the situation-optimized dictionary 14 when the user searches a name in the telephone directory stored in the portable telephone to make a phone call. In this case, the content of the situation-optimized dictionary 14 matches with what the situation acquiring part 12 has acquired as the stored content of the telephone directory. This means, if the numeric buttons are pressed in the order "212", the candidate character string "ko-i-ke" (which is a Japanese family name) is given as the output in the mode of name searching the telephone directory.

In the candidate character string generation state, which is set by the situation control part 13, the candidate character string generation part 15 generates an optimal candidate character string from the entered character string, in accordance with the situation, and sends it to the character string processing device 2.

The optimal candidate character string sent to the character string processing device 2 is output by an output part in the character string processing device 2. Incidentally, an optimal candidate character string does not necessarily have to be determined unequivocally, and it is also possible that more than one optimal candidate character strings are generated after performing an optimum ranking, and that the user selects one candidate character string with the character string processing device 2.

With respect to the candidate character string outputted by the output part of the character string processing device 2, the user performs an affirmation command with the candidate character string affirmation part 16. "Affirmation command" means that the user gives a command which affirms an output character string, which can be done, for example, by selecting a certain candidate character string from a plurality of candidate character strings. It is also possible that the user does not undertake any particular declaratory operation, but that the affirmation is taken to be made when the user goes on to the next input operation.

When the user has given the command to affirm the candidate character string, the candidate character string affirmation part 16 sends the affirmed character string to the situation control part 13. The situation control part 13 sends the current input situation and the affirmed character string to the affirmed character string storing part 17. Then, the affirmed character string storing part 17 stores the affirmed character string with the situation-optimized dictionary 14 in accordance with the current input situation.

FIG. 5 shows an example of the situation-optimized dictionary 14. In FIG. 5, the stored items include the numerical string entered, the stored character string, the date that the character string has been used last, and the number of times that the character string has been used (also referred to as "recurrence") is stored. The date that the character string has been accessed last and the number of times that the character string has been accessed are renewed when the affirmed character string storing part 17 stores the affirmed character string. It should be noted that in addition to the date, it is also possible to include the time that character string has been accessed last.

Based on the date of the last access of the character string, it is possible to generate the candidate character string with priority given to recently accessed character strings, or with priority given to character strings with a access frequency. It goes without saying that it is also possible to combine these two factors, and to calculate an estimate value by weighting the priorities.

Moreover, based on the date of the last access of the character string, character strings that have not been accessed for a certain period of time are deleted from the situation-optimized dictionary 14. For example, character strings that have been affirmed by error or have been accessed accidentally only once can be deleted after a certain period of time, so that data that is unnecessary to generate candidate character strings can be deleted from the situation-optimized dictionary 14, and the capacity of the dictionary can be used economically.

If the divisional units for the character strings are defined by separating words by "spaces" as in English for example, it is possible to store word units by separation with spaces. However, in languages in which the division into word units is difficult, such as in Japanese, it is preferable to perform the division into words after a morphological analysis or with a suitable method such as taking the point where the type of character (for example, kanji and kana characters) changes as the separation.

As an example, let's examine the Japanese word "pataan-ninshikisouchi", which means "pattern recognition device" in English. The part "pataan" of this word is written in katakana characters, i.e. one of the two Japanese types of syllabic kana characters, whereas the part "ninshikisouchi" of the word is written in kanji characters. When the word "pataanninshikisouchi" is divided into character strings, it can be divided by morphological analysis into "pataannin-shiki" (pattern recognition) and "souchi" (device). Alternatively, if it is divided where the type of character changes (here, from kana characters for "pataan" into kanji characters for "ninshikisouchi"), it can be divided into "pataan" and "ninshikisouchi".

There is a certain physical limit to the situation-optimized dictionary 14 in that it is limited by computer resources. That is to say, it is not possible to store more than a certain amount of data. Based on the date of the last access of the character strings, the character strings with the oldest date of last access can be deleted successively from the situation-optimized dictionary 14, so that it is possible to maintain the maximum storage number of character strings or the maximum storage capacity of the situation-optimized dictionary 14 constant.

By adding the time of last access to the date, an even more precise management of the stored character strings becomes possible. It is also possible to delete character strings from the situation-optimized dictionary 14 dynamically after a certain period of time has elapsed, or when a new word is input and stored in the situation-optimized dictionary 14.

It is preferable that the user can set the maximum storage number or the maximum storage capacity freely, depending on the computer resources.

It is also possible to provide further a situation-optimized character string dictionary production part for producing a situation-optimized dictionary 14 by treating character strings that are used in a pre-existing electronic text in the same manner as affirmed character strings in the situation-optimized dictionary 14. In this case, whereas it is a fact that a user who uses the character string input device in a certain situation for the first time can hardly expect a candidate character string to be generated in accordance with this situation, it becomes possible to a certain degree to generate candidate character strings in accordance with the situation from the first time they are used.

Figure 6:
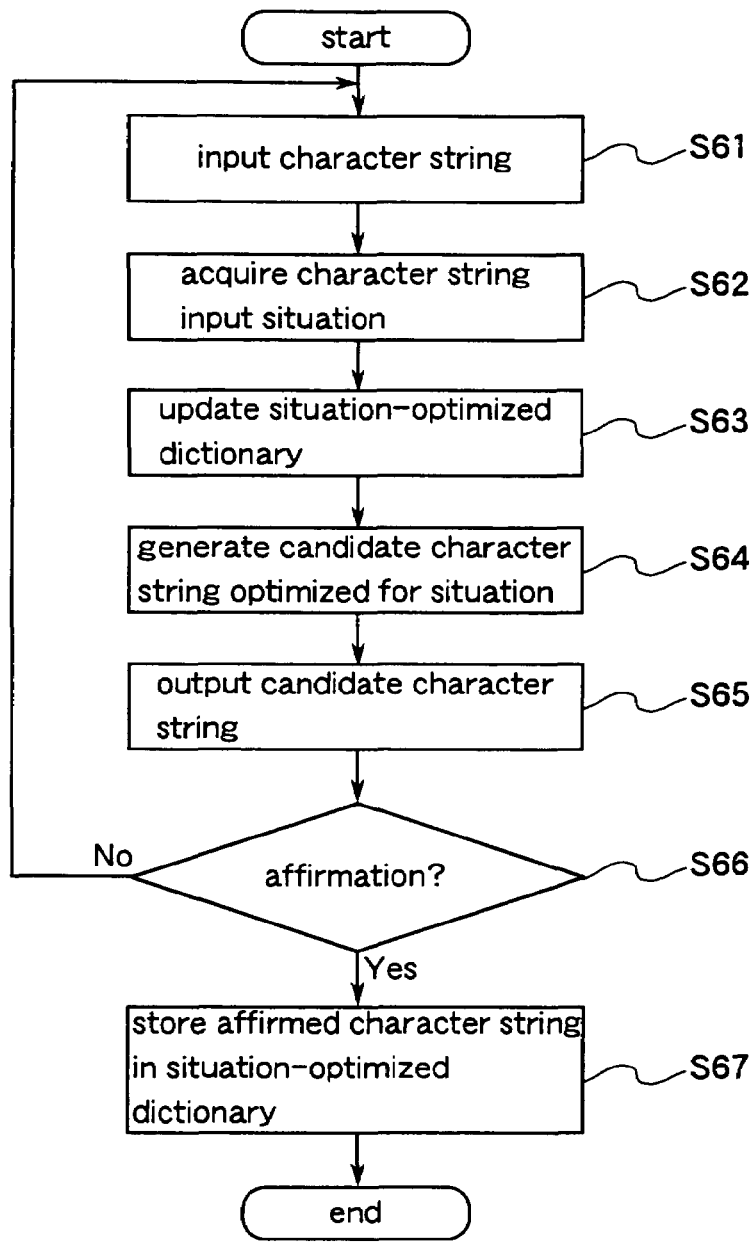
FIG. 6 is a flowchart for the first embodiment of a device for entering a character string in accordance with the present invention.

The following is an explanation of the process flow of a program for realizing the first embodiment of a device for entering a character string in accordance with the present invention, with reference to FIG. 6.

In FIG. 6, when a character string is entered by the user (step S61), the situation when the character string is entered, that is, information on what kind of device the character string processing device 2 is (for example, a schedule inputting device, an electronic mail inputting device, etc.), what kind of text is entered into the character string processing device 2, what the current position in the text is (for example, the "mail address" field in a mail that is being sent out), and what mode the character string processing device 2 is in (in a telephone number processing device, for example, search mode, storage mode, etc.) is acquired (step S62). Then, depending on the acquired situation, the situation-optimized dictionary 14 is changed and referenced dynamically (step S63).

By selecting and referencing the situation-optimized dictionary 14 in accordance with the situation, an optimal candidate character string is generated in accordance with the situation (step S64) and is output as the candidate character string by the character string processing device 2 (step S65).

Then, after performing a process in which the user affirms the input character string (step S66: yes), the affirmed character string is stored in the situation-optimized dictionary 14 (step S67), so that it can be applied for processing from the next time onward.

Thus, with this first embodiment, by dynamically renewing the contents of the situation-optimized dictionary 14 in accordance with the situation in which a character string is being entered, it is possible to achieve the optimum content for the input situation, and by performing the processing for the generation of the candidate character strings in accordance with the situation using the situation-optimized dictionary 14, it is possible to enter character strings with a high hit ratio.

Second Embodiment

Figure 7:
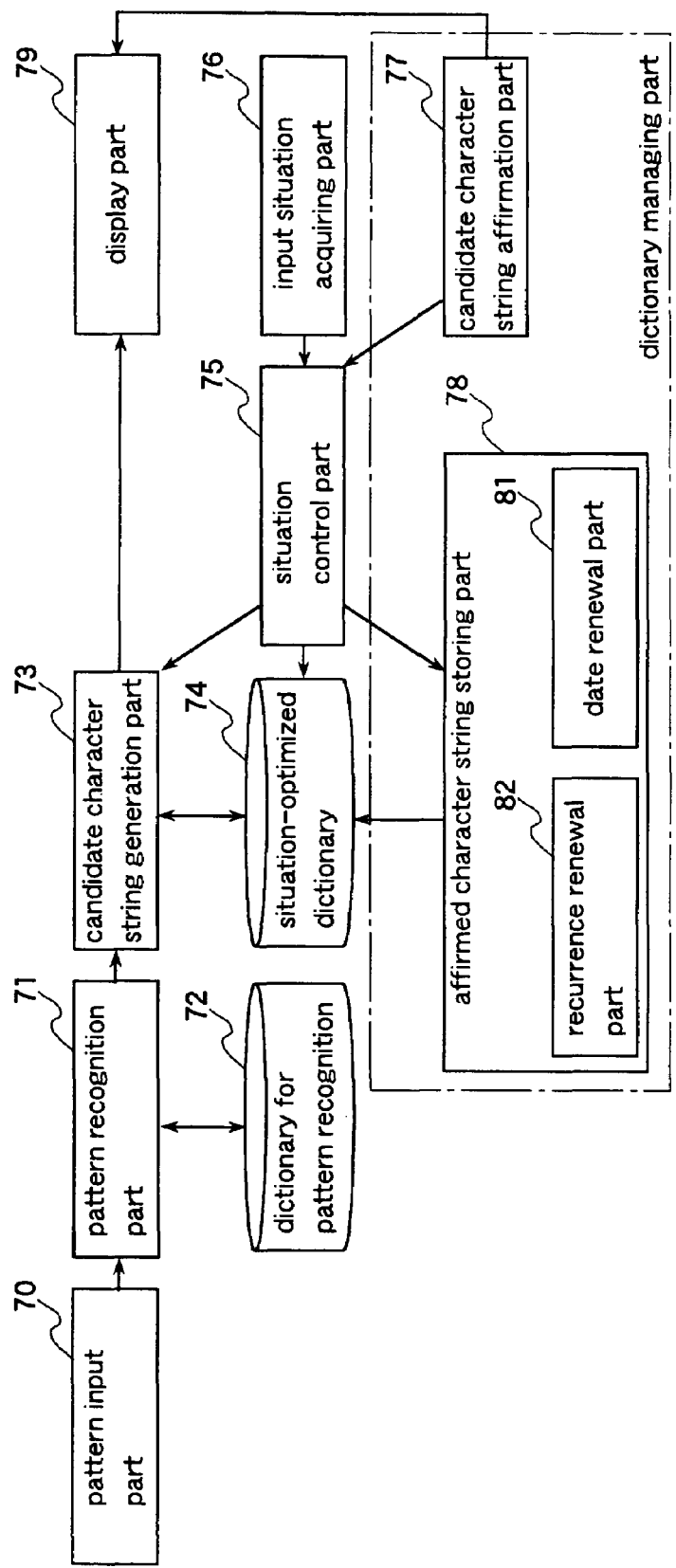
FIG. 7 is a diagram of a pattern recognition device in accordance with the present invention.

The following is an explanation of a second embodiment of a device for entering character strings in accordance with the present invention, with reference to the accompanying drawings. FIG. 7 is a block diagram of the second embodiment of a device for entering a character string in accordance with the present invention, which can be applied, for example, to a portable computer. In this example, character strings are entered by pattern recognition of, for example, handwritten characters. In FIG. 7, numeral 70 denotes a pattern input part comprising a handwritten input part accepting input with a pen on a part of a display screen, numeral 71 denotes a pattern recognition part, numeral 72 denotes a dictionary for pattern recognition, numeral 73 denotes a candidate character string generation part, numeral 74 denotes a situation-optimized dictionary, numeral 75 denotes a situation control part assuming candidate character string generation status depending on the situation, numeral 76 denotes an input situation acquiring part, numeral 77 denotes a candidate character string affirmation part, numeral 78 denotes an affirmed character string storing part, and numeral 79 denotes a display part including the previously described handwritten input part. Moreover, a dictionary managing part 80, which is a characterizing feature of the second embodiment, includes the candidate character string affirmation part 77 and the affirmed character string storing part 78, which is provided with a date renewal part 81 and a recurrence renewal part 82.

In FIG. 7, a pattern to be recognized is entered with the pattern input part 70. In this first embodiment this is a handwritten character string. The entered pattern is sent to the pattern recognition part 71.

Figure 8:
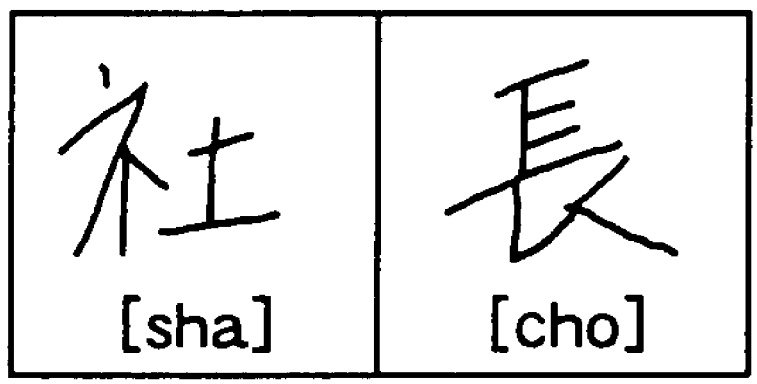
FIG. 8 shows an example of a handwritten character input pattern.

The second embodiment is explained by way of an example where the word "shachou" is entered as a handwritten pattern. The Japanese word "shachou", which means "company president" in English, consists of two kanji characters, as is shown in FIG. 8. In FIG. 8, the left kanji character is read "sha" and the right kanji character is read "chou". Of course, the present invention is not limited to this method of input, and other methods of input, such as voice input, are also possible. FIG. 8 illustrates the case that the input is performed character by character with handwriting within specified frames, but there is no particular limitation to this, and the input can also be a handwritten character string in an input section without frames.

The pattern recognition part 71 looks up the entered pattern, with reference to the dictionary for pattern recognition 72, and outputs recognized candidate characters in order of exactitude to the candidate character string generation part 73. To extract the recognized candidate characters, it is possible to use a commonly used OCR engine or online recognition engine, or any other kind of recognition engine. To calculate the exactitude, several methods are possible, for example, to calculate the distance between the entered pattern and the pattern of the dictionary for pattern recognition 72, or to make a calculation based on characteristic features. FIG. 9 shows an example of the recognition results for the case that the characters for "shachou" are entered by handwriting as shown in FIG. 8. In FIG. 9, the numbers listed next to the recognized candidate characters express the exactitude of the corresponding recognized candidate character, and the larger this number is, the higher is the exactitude.

Based the result of the recognition obtained with the pattern recognition part 71, the candidate character string generation part 73 determines a pattern-recognized candidate character string that is optimal for the entered pattern, using the situation-optimized dictionary 74.

Figure 10:
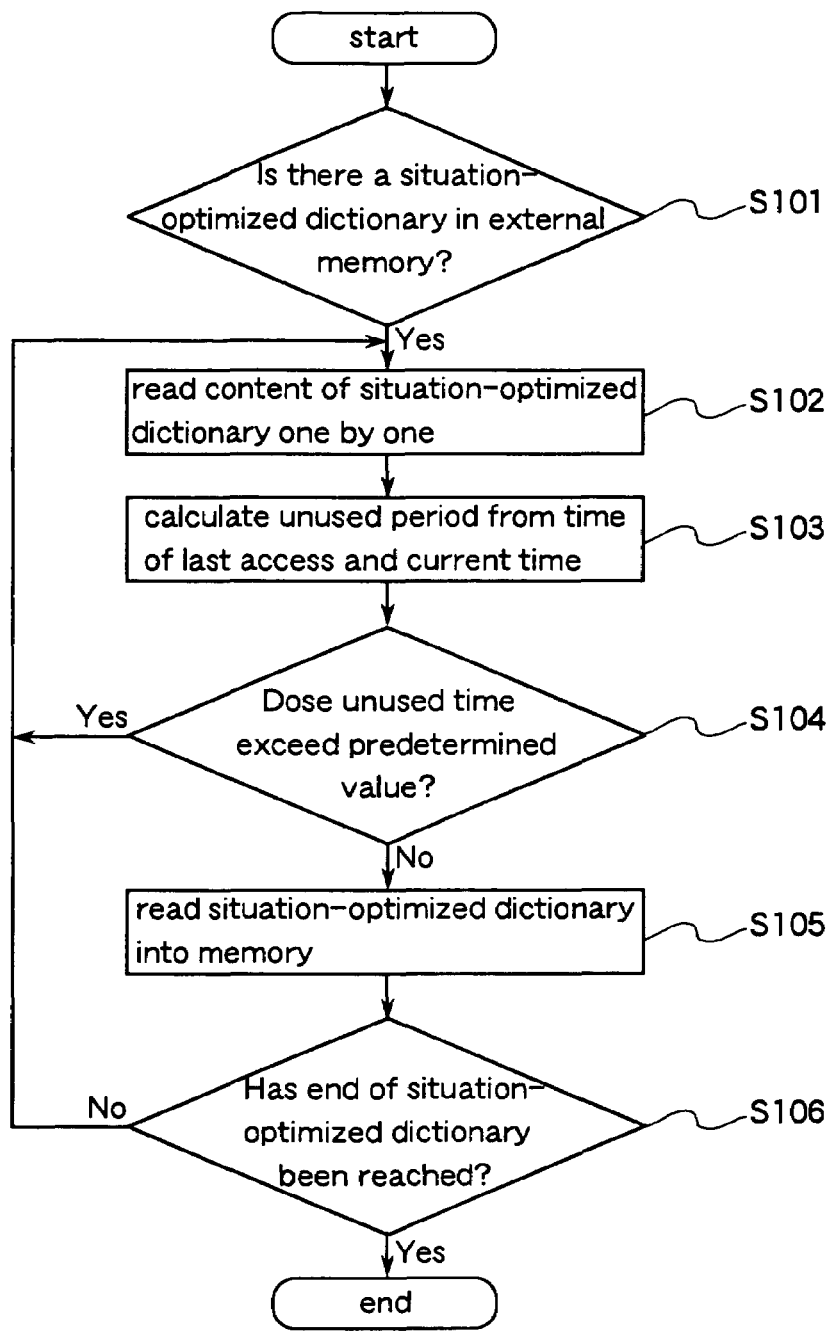
FIG. 10 is a flowchart of the process at the start of the recognition operation.

As is shown in the flowchart of FIG. 10, the situation-optimized dictionary 74 is read in from an external memory to an internal memory when the recognition operation begins. At first, the recognized candidate character strings are compared with the character strings stored in the situation-optimized dictionary 74, which has been read into the internal memory. Based on the exactitude of the recognized candidate character strings with respect to the character strings in the situation-optimized dictionary 74, estimate values are calculated for the recognized candidate character strings. After comparison of the calculated estimate values, the recognized candidate character string with the highest estimate value is selected. Thus, an optimal pattern-recognized candidate character string can be determined when there is more than one candidate character string. Moreover, taking into account the date of the last access or the number of accesses, which are stored in the situation-optimized dictionary 74, the reliability of the estimate value with respect to the recognized candidate character strings can be enhanced, and a user-adapted recognized candidate character string can be output as the optimum pattern-recognized candidate character string.

The following explains an example of the calculation of the estimate value. A recognized candidate character string W that is output from the pattern recognition part 72 can be expressed by a combination of n candidate characters $C_1 \cdot C_2 \cdot \ldots C_n$ (wherein n is a positive integer). Let $S_i$ be the exactitude for a recognition candidate character $C_i$. If the recognized candidate character string W is in the situation-optimized dictionary 74, then the estimate value Z can be expressed by $$Z = \sum_{i=1}^{n} S_i + n \times \alpha \quad (\alpha > 0) \qquad \text{Eq. 1}$$

Here, $\alpha$ is a factor that shows how the fact that the recognized candidate character string W is in the situation-optimized dictionary 74 is weighted, and which can be changed by the user.

If the recognized candidate character string W is not in the situation-optimized dictionary 74, the estimate value Z can be expressed by $$Z = \sum_{i=1}^{n} S_i \qquad \text{Eq. 2}$$

By determining the estimate value Z with Eq. 1 or Eq. 2, a comprehensive estimate including the exactitude from the pattern recognition part 72 is possible, even if the combination of recognized candidate characters can be found incidentally in the situation-optimized dictionary 74. Thus, it is possible to output an adequate character string as the recognized candidate character string.

If the recognized candidate character string W is in the situation-optimized dictionary 74, it is also possible to express the estimate value Z by $$Z = \sum_{i=1}^{n} S_i + n \times (\alpha f(freq(W)) + \beta g(passtime(W))) \qquad \text{Eq. 3}$$

$$(\alpha \geq 0, \beta \geq 0)$$

Here, freq(W) indicates the access frequency of the recognized candidate character string W stored in the situation-optimized dictionary 74, and passtime(W) indicates the time that has passed since the recognized candidate character string W has been accessed for the last time. Moreover, f(freq(W)) is a function of the access frequency, and g(passtime(W)) is a function of the passed time. By weighting the functions f and g with the factors α and β, it is possible to adjust freely with what weighting the access frequency and the passed time are evaluated.

For example, if, as shown in FIG. 11, the recognized candidate character strings "shachou" (which means company president in Japanese) and "rei-wo" (which means "thanks" in Japanese) are stored, and the estimate value is calculated with Eq. 1 for α=30, then, as shown in FIG. 12, an estimate value Z=1567 is obtained for the character string "shachou", by adding the sum of the exactitude 748 for "sha" with the exactitude 759 for "chou" to number of characters 2×α=60. Similarly, the estimate value for the character string "rei-wo" is calculated to Z=1500. Consequently, the character string "shachou", which has the higher estimate value, is recognized.

Figure 13:
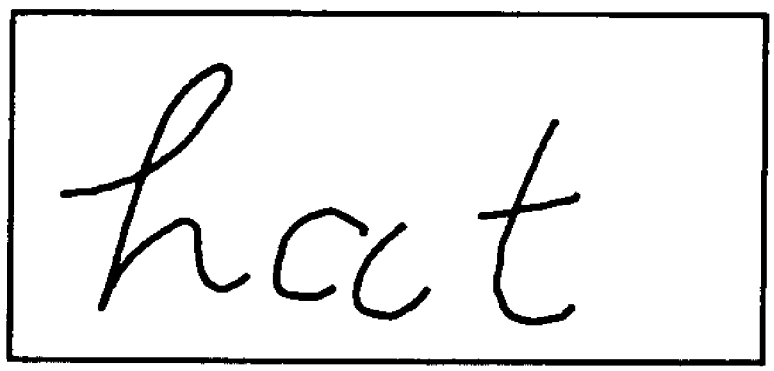
FIG. 13 shows an example of a handwritten character input pattern.

It is also possible that handwritten characters are entered as English text, as shown in FIG. 13. Similar to the case of Japanese character strings, the following is an example of the calculation of the estimate value with Eq. 3, when the two English recognized candidate character strings "hat" and "hut" are stored in the situation-optimized dictionary 74 as shown in FIG. 14.

Based on the recognition result shown in FIG. 15, for the character string "hat", the sum of the exactitude 858 for the letter "h", the exactitude 839 for the letter "a", and the exactitude 888 for the letter "t" is calculated to be 2585.

Here, it is assumed that α=5, β=10, f(1)=1, f(2)=2. Moreover, the date of execution is Jan. 6, 1999, and if the date of the last access is Jan. 3, 1999, then the passed number of days takes on the value "3", whereas it would be "0" if the date of the last access is Jan. 6, 1999. With these values as arguments, it is assumed that g(0)=10 and g(3)=7.

If the estimate value is calculated for this case, since the number of characters is 3, Eq. 3 yields $$2585+3\times(5\times f(1)+10\times g(3))=2585+3\times(5\times 1+10\times 7)=2810.$$

Similarly, if the estimate value is calculated for the character string "hut", the sum of the exactitude 858 for the letter "h", the exactitude 783 for the letter "u", and the exactitude 888 for the letter "t" is 2529, and adding 3×(5×f(1)+10×g(3))=3×(5×1+10×7)=225 yields 2754.

Calculating the estimate value for all character strings as shown in FIG. 16, the character string "hat", which has the highest estimate value, will be outputted as the recognized character string.

Next, the case is examined that the user performs a correction with regard to a recognized result. This might be the case, when the entered character string is not affirmed as "hat" but as "hut".

In this case, the contents of the situation-optimized dictionary 74 changes as shown in FIG. 17 at the time when "hut" is affirmed. This means that the date of the last access for the character string "hut" becomes Jan. 6, 1999, and the number of accesses is increased to "2".

If in this situation, the character pattern of FIG. 13 is entered again, and the recognition result is as shown in FIG. 15, calculating the estimate values for each character string as above, gives the following result.

Firstly, if the estimate value is calculated for the character string "hat" as above, the sum of the exactitude 858 for the letter "h", the exactitude 839 for the letter "a", and the exactitude 888 for the letter "t" is 2585, and adding 3×(5×f(1)+10×g(3))=3×(5×1+10×7)=225 yields 2810.

On the other hand, for the character string "hut", the sum of the exactitude 858 for the letter "h", the exactitude 783 for the letter "u", and the exactitude 888 for the letter "t" is 2529, and adding 3×(5×f(2)+10×g(0))=3×(5×2+10×10)=330 yields 2859.

Consequently, as above, if the estimate values for all character strings are calculated as shown in FIG. 18, it is determined that the character string "hut" has the highest estimate value, and therefore "hut" is outputted as the recognized character string.

The reference of the situation-optimized dictionary 74 in the candidate character string generation part 73 is not limited to the case where the entire character string is matching, but it is also possible to extract partially matching character strings as recognized candidate character strings. This is because it cannot be guaranteed that the character strings are entered in the units of the character strings that are stored in the situation-optimized dictionary 74.

Moreover, if the result of the reference to the situation-optimized dictionary 74 by the candidate character string generation part 73 is that there is no corresponding character string among the character strings stored in the situation-optimized dictionary 74, it is possible to perform a candidate character string determination process using a pre-existing lexicon or a conventional N-gram statistical dictionary, and to output the result as the optimal pattern recognition result.

The recognized candidate character string that is decided by the candidate character string generation part 73 as the pattern recognition result is outputted to the display part 79. Then, if the user judges the recognized candidate character string displayed by the display part 79 to be faulty, the user can perform a correction process with the candidate character string affirmation part 77.

Figure 20:
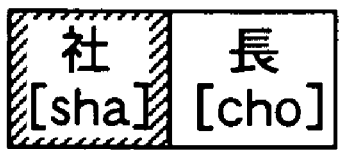
FIG. 20 shows an example of a process for correcting a recognized candidate character string.
Figure 20:
Figure 20:
Figure 20:

Here, "correction process" means that the recognized candidate character strings are displayed in the order of their calculated estimate values, and the user either selects the correct character string as the recognized character string or enters a new pattern to be recognized anew. For example, if, as shown in FIG. 19(*a*), the character string "reichou" (which is not a valid Japanese word, and which consists of the two Japanese kanji characters "rei" and "chou") has been recognized, it is possible, as shown in FIG. 19(*b*), to select the character "sha", which has a high exactitude. Also, as shown in FIG. 20(*a*), if unintentionally the character string "reichou" (which is not a valid Japanese word) has been recognized as in FIG. 19, it is possible to select, for example, the "reenter" button, whereby the recognized candidate character "rei" is deleted, and correction is possible by entering a new handwritten character string. It should be noted that there is no limitation to these processing methods, but any method can be employed with which the correct pattern is recognized that user had intended to enter.

If the user judges that the outputted recognized character string is correct, the user can perform the affirmation process with the candidate character string affirmation part 77 in the dictionary managing part 80. Here, "affirmation process" means that the user gives an instruction to the effect that he affirms the recognized character string. Moreover, there is no particular limitation to methods where the user undertakes a declaratory affirmation instruction, and it is also possible that the affirmation is taken to be made when the user goes on to make the next input without undertaking any correction process, or that the outputted character string is taken to be affirmed when switching to another application.

Figure 21:
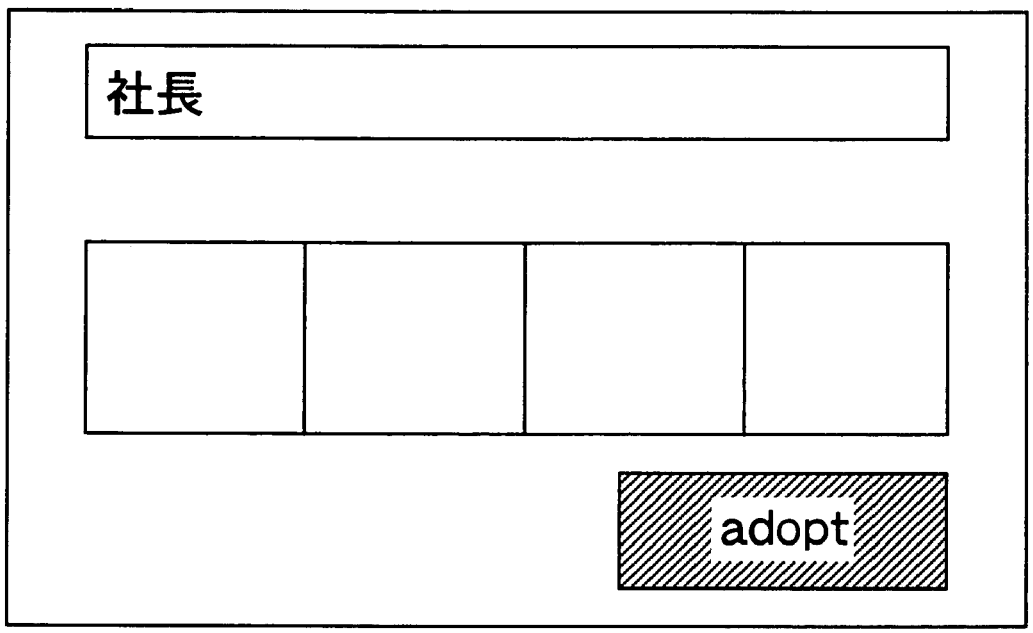
FIG. 21 shows an example of a process for correcting a recognized candidate character string.
Figure 22:
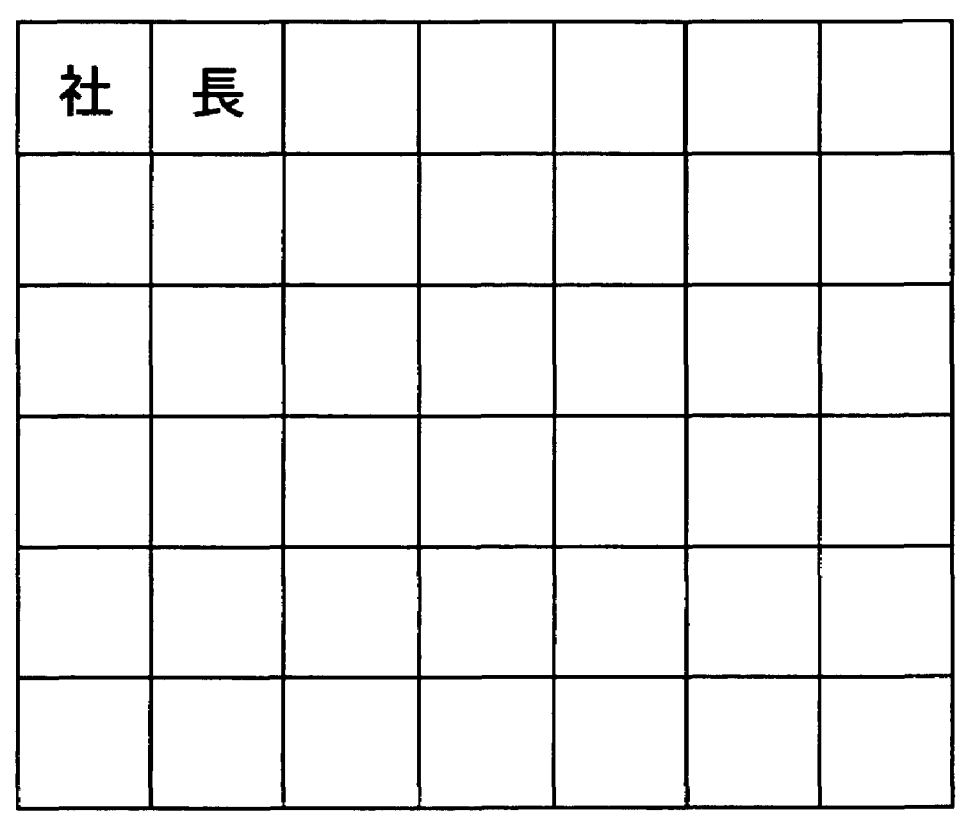

For example, if the handwritten character string "shachou" has been recognized correctly as "shachou", as shown in FIG. 21, the user can affirm the recognized character string declaratorily by pressing an "adopt" button or the like. If, as shown in FIG. 22, the entire sentence including the recognized result of the handwritten characters "shachou" is listed and displayed, the displayed character string "shachou" is regarded as an affirmed recognized character string, if another character on the display is corrected or a new character is entered.

Then, if the affirmation process for affirming a recognized character string is preformed with the candidate character string affirmation part 77, the affirmed recognized character string is stored by the affirmed character string storing part 78 in the situation-optimized dictionary 74. FIG. 11 shows an example of a situation-optimized dictionary 74. In the situation-optimized dictionary 74 in FIG. 11, character strings, the date when the character strings have been accessed for the last time, and the number of times that they have been accessed are stored. The date when the character strings have been accessed for the last time, and the number of times that they have been accessed are renewed through the date renewal part 81 and the recurrence renewal part 82, and stored in the situation-optimized dictionary 74 through the affirmed character string storing part 78. In addition to the date, it is also possible to include the time that character string has been accessed last.

For example, if the character string "shachou" is affirmed as the recognized character string by performing a correction process with respect to the recognized candidate character string shown in FIG. 21 with the candidate character string affirmation part 77, the affirmation character string storing part 78 stores the word "shachou" in the situation-optimized dictionary 74. If the character string "shachou" has previously not been stored in the situation-optimized dictionary 74, a new storage is performed, and if it has previously been stored, the date of the last access is changed to the current date, and the access recurrence is increased by "1".

Moreover, based on the dates when the character strings have been accessed for the last time, it is also possible to perform a candidate character string determination process giving priority to character strings that have been accessed recently, or giving priority to character strings with a high access recurrence. It goes without saying that it is also possible to combine these two factors, and to calculate an estimate value by weighting the priorities.

Moreover, when storing the recognized character string affirmed by the user in the situation-optimized dictionary 74, it is also possible to store, of all affirmed recognized character strings, only recognized character strings including a part for which the user has performed a correction process. Since it can be expected that the next time that the same pattern as for a recognized character string that has been affirmed without performing a correction process is entered, the character string will be recognized correctly again, there is no necessity to store it in the situation-optimized dictionary 74. Consequently, by not storing such recognized character strings in the situation-optimized dictionary 74, the number of stored character strings in the situation-optimized dictionary 74 can be reduced, which makes it possible to decrease the size of the situation-optimized dictionary 74.

Moreover, if a plurality of users share the same terminal, it is possible to provide user-specific situation-optimized dictionaries 74, in correspondence to, for example, a user ID that is entered when the user changes. This makes it possible to allow for a pattern recognition accommodating the usage of individual users.

With the second embodiment as described above, in response to the access situation of the user, the situation-optimized dictionary can be adapted to a content that is optimal for the actual situation of the user, and even if the input is handwritten, it is possible to execute a pattern recognition with a high recognition rate, and to enter the character strings intended by the user.

Figure 23:
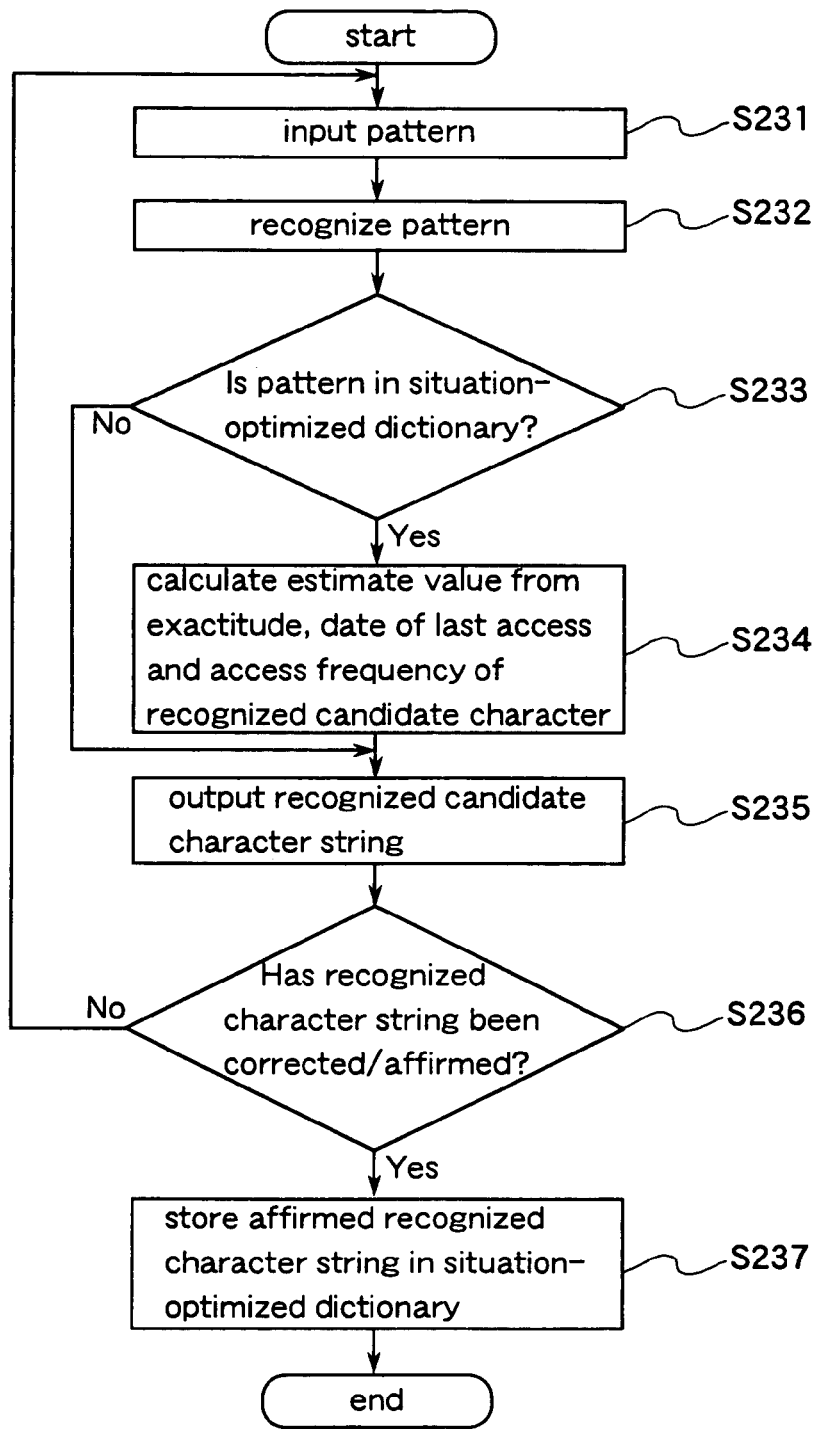
FIG. 23 is a flowchart for an embodiment of pattern recognition device in accordance with the present invention.

The following is an explanation of the process flow of a program for realizing the second embodiment of a device for entering a character string in accordance with the present invention, with reference to FIG. 23.

In FIG. 23, if the user enters a pattern (step S231), for example handwritten characters or voice input, a pattern recognition is performed for the entered pattern (step S232), and the recognized candidate character string (or a combination of recognized candidate character strings) is looked up in the situation-optimized dictionary (step S233).

If the recognized candidate character string is in the situation-optimized dictionary, an estimate value is calculated, which comprehensively evaluates the exactitude of the recognized candidate characters, the date of the last access, and the access recurrence (step S234). Then, the most suitable recognized candidate character string is given out (step S235). If the recognized candidate character string is not in the situation-optimized dictionary, a combination of recognized candidate characters is pretended to be the recognized candidate character string.

Then, after the user has performed, for example, a correction of the recognized candidate character string, the affirmation of the recognized candidate character string is processed (step S236). Then, in order to apply the results in future processes, the affirmed recognized character string is stored in the situation-optimized dictionary (step S237).

Figure 24:
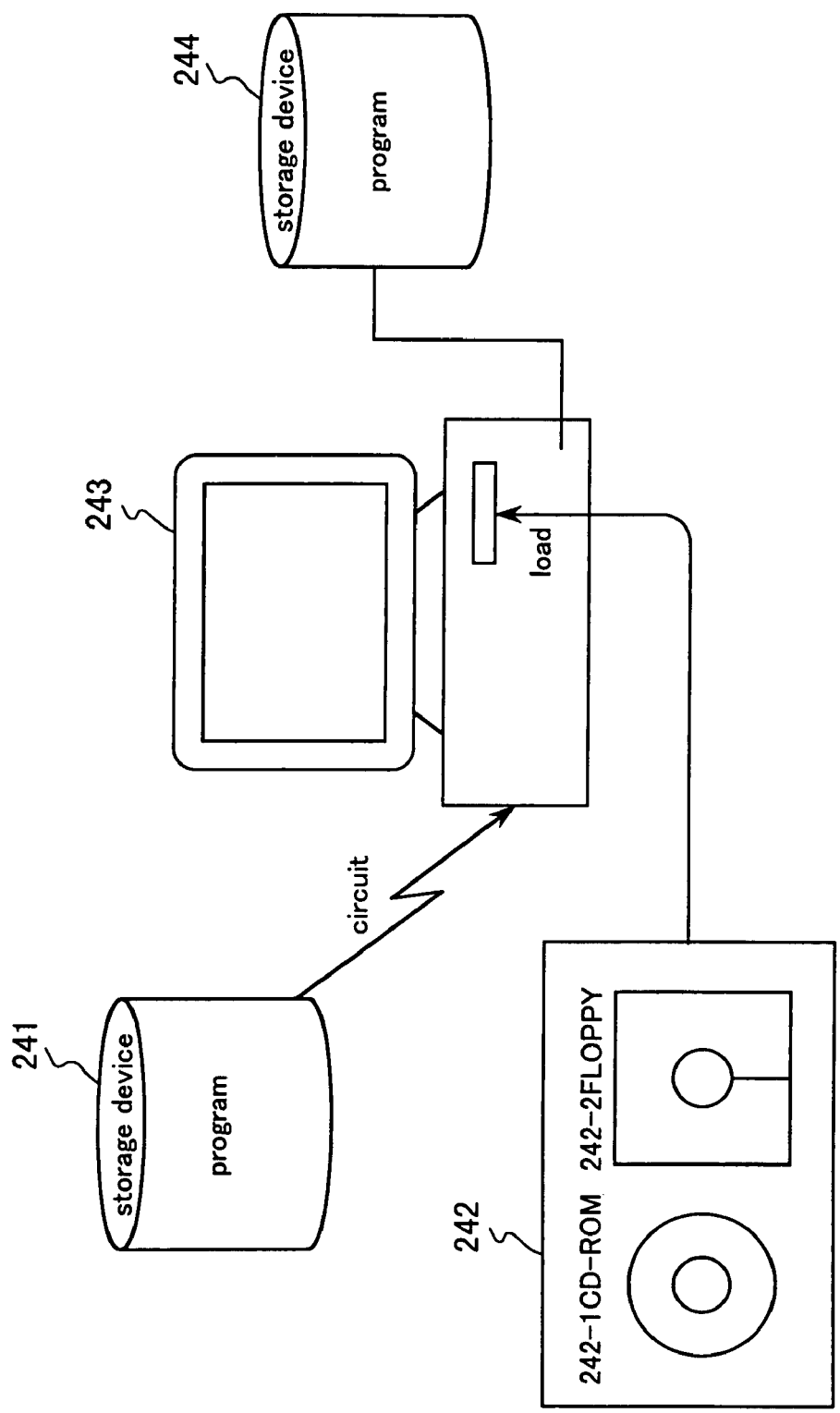
FIG. 24 shows examples of recording media.

FIG. 24 shows examples of recording media storing a program for realizing an embodiment of the device for entering a character string in accordance with this invention. As shown in FIG. 18, such recording media can be not only portable recording media 242 such as a CD-ROM 242-1 or a floppy disk 242-2, but also a memory device 241 connected by a communication circuit, or any other recording device 244 such as a computer's hard disk or a RAM. To execute the program, the program is loaded and executed on the main memory.

Moreover, as shown in FIG. 24, the recording media storing the situation-optimized dictionary generated with an embodiment of the device for entering a character string in accordance with this invention can be not only portable recording media 242 such as a CD-ROM 242-1 or floppy disk 242-2, but also a memory device connected by a communication circuit, or any other recording device 244 such as a computer's hard disk or a RAM, which can be read into a computer 243 when the device for entering a character string in accordance with this invention is used, for example.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. A device for entering a character string into a plurality of character string processing devices, comprising:

an input part allowing a user to enter the character string to be entered into the plurality of character string processing devices;

an input situation acquiring part for acquiring a situation peculiar to current input processing among a plurality of situations of at least one of the character string processing devices that has been started or an activated program on at least one of the character string processing devices from the at least one of the character string processing devices or the activated program into which the character string is given;

a situation control part for affirming one of a plurality of dictionaries used for generating a candidate character string or a part of such a dictionary in accordance with the situation acquired with the input situation acquiring part and designating the affirmed dictionary or the affirmed part of the dictionary as a situation-optimized dictionary;

a candidate character string generation part for generating and outputting an output candidate character string that is optimal for the acquired situation in response to a character string that is entered with the input part, using the situation-optimized dictionary;

a candidate character string affirmation processing part for affirming the outputted candidate character string; and an affirmed character string storing part for storing a character string that has been affirmed with the affirmation processing part in the situation-optimized dictionary designated by the situation control part under a condition that the character string is associated with the situation acquired with the input situation acquiring part, and updating the contents of the situation-optimized dictionary dynamically.

2. The device for entering a character string according to claim 1, wherein the situation of the at least one of the character string processing device devices comprises at least one information selected from a group consisting of:

information relating to a kind of the character string processing device;

information relating to a text that the character string processing device can output;

information relating to a position in a text that the character string processing device; and information relating to a user inputting the character string.

3. The device for entering a character string according to claim 1, wherein the affirmed character string storing part stores a storage date of an affirmed character string as a last-access date when storing the affirmed character string, the date when a character string that is already stored is accessed is used to change the last-access date, and the last-access date is used when the candidate character string generation part generates the output candidate character string.

4. The device for entering a character string according to claim 1, further comprising a situation-optimized dictionary production part for producing a situation-optimized dictionary by associating character strings that are used in a pre-existing electronic text with information relating to a user creating the electronic text, information relating to a time when the electronic text has been created, and information relating to a character string processing apparatus by which the electronic text has been created.

5. A method for entering a character string into a plurality of character string processing devices, comprising:

entering a character string to be entered into the plurality of character string processing devices;

acquiring a situation peculiar to current input processing among a plurality of situations of at least one of the character string processing devices that has been started or an activated program on at least one of the character string processing devices from the at least one of the character string processing devices or the activated program into which the character string is given;

affirming one of a plurality of dictionaries used for generating a candidate character string or a part of such a dictionary in accordance with the acquired situation and designating the affirmed dictionary or the affirmed part of the dictionary as a situation-optimized dictionary;

generating and outputting an output candidate character string that is optimal for a situation in response to an entered character string, using the designated situation-optimized dictionary;

affirming the outputted candidate character string; and storing an affirmed character string in the situation-optimized dictionary under a condition that the character string is associated with the acquired situation, and updating the contents of the situation-optimized dictionary dynamically.

6. The method according to claim 5, wherein the situation of the at least one of the character string processing devices comprises at least one information selected from a group consisting of:

information relating to a kind of the character string processing device information relating to a text that the character string processing device can output;

information relating to a position in a text that the character string processing device; and information relating to a user inputting the character string.

7. A computer-readable recording medium storing a method for entering a character string into a plurality of character string processing devices, the stored method comprising:

entering a character string to be entered into the plurality of character string processing devices;

acquiring a situation peculiar to current input processing among a plurality of situations of at least one of the character string processing devices that has been started or an activated program on at least one of the character string processing devices from the at least one of the character string processing devices or the activated program into which the character string is given;

affirming one of a plurality of dictionaries used for generating a candidate character string or a part of such a dictionary in accordance with the acquired situation and designating the affirmed dictionary or the affirmed part of the dictionary as a situation-optimized dictionary;

generating and outputting an output candidate character string that is optimal for a situation in response to an entered character string, using the designated situation-optimized dictionary;

affirming the outputted candidate character string; and storing an affirmed character string in the situation-optimized dictionary under a condition that the character string is associated with the acquired situation, and updating the contents of the situation-optimized dictionary dynamically.

8. The computer-readable recording medium according to claim 7, wherein the situation of the at least one of the character string processing devices comprises at least one information selected from a group consisting of:

information relating to a kind of the character string processing device information relating to a text that the character string processing device can output;

information relating to a position in a text that the character string processing device; and information relating to a user inputting the character string.

9. A method for entering a character string into a plurality of character string processing devices, comprising:

entering a character string to be entered into the plurality of character string processing devices;

acquiring a situation peculiar to current input processing among a plurality of situations of at least one of the character string processing devices that has been started or an activated program on at least one of the character string processing devices from the at least one of the character string processing devices or the activated program into which the character string is given; and affirming one of a plurality of dictionaries used for generating a candidate character string or a part of such a dictionary in accordance with the acquired situation and designating the affirmed dictionary or the affirmed part of the dictionary as a situation-optimized dictionary.

* * * * *

UNITED STATES PATENT AND TRADEMARK OFFICE
CERTIFICATE OF CORRECTION

| | |
|---|---|
| PATENT NO. | : 7,007,233 B1 |
| APPLICATION NO. | : 09/457267 |
| DATED | : February 28, 2006 |
| INVENTOR(S) | : Naomi Iwayama |

It is certified that error appears in the above-identified patent and that said Letters Patent is hereby corrected as shown below:

First Page, Column 2 Item [56]: (U.S. Patent Documents), Line 3, delete "8,507,891" and insert -- 6,507,891 B1 -- therefor.

First Page, Column 2 (Foreign Patent Documents), Line 6, delete "1/1997" and insert -- 10/1997 -- therefor.

Column 17, Line 31, after "processing" delete "device".

Signed and Sealed this

Twenty-fifth Day of July, 2006

JON W. DUDAS
*Director of the United States Patent and Trademark Office*